United States Patent
Good et al.

(10) Patent No.: US 10,495,823 B2
(45) Date of Patent: *Dec. 3, 2019

(54) REVERSIBLE POLARITY MPO FIBER OPTIC CONNECTOR

(71) Applicant: US Conec, Ltd., Hickory, NC (US)

(72) Inventors: Paul Michael Good, New Holland, PA (US); William E. Ayres, III, Center Valley, PA (US); Greg Heffner, Ephrata, PA (US)

(73) Assignee: US Conec Ltd., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,883

(22) Filed: Nov. 1, 2017

(65) Prior Publication Data

US 2018/0128987 A1   May 10, 2018

Related U.S. Application Data

(63) Continuation of application No. 14/319,132, filed on Jun. 30, 2014, now Pat. No. 9,829,645.

(51) Int. Cl.
*G02B 6/38* (2006.01)

(52) U.S. Cl.
CPC ......... *G02B 6/3831* (2013.01); *G02B 6/3851* (2013.01); *G02B 6/3883* (2013.01); *G02B 6/3885* (2013.01); *G02B 6/3882* (2013.01)

(58) Field of Classification Search
CPC .............................. G02B 6/3831; G02B 6/3851
See application file for complete search history.

(56) References Cited

U.S. PATENT DOCUMENTS

| | | | |
|---|---|---|---|
| 4,979,792 A | 12/1990 | Weber et al. |
| 5,167,542 A | 12/1992 | Haitmanek |
| 5,335,301 A | 8/1994 | Newman et al. |
| 5,521,997 A | 5/1996 | Rovenolt et al. |
| 6,364,537 B1 | 4/2002 | Maynard |
| 6,371,658 B2 | 4/2002 | Chong |
| 6,634,796 B2 | 10/2003 | Jong et al. |

(Continued)

FOREIGN PATENT DOCUMENTS

| | | |
|---|---|---|
| JP | H02146511 A | 6/1990 |
| JP | H11281849 A | 10/1999 |

(Continued)

OTHER PUBLICATIONS

International Search Report dated Nov. 26, 2015.

*Primary Examiner* — Daniel Petkovsek

(57) ABSTRACT

A multi-fiber, fiber optic connector is provided having a housing having a first end for receiving a multi-fiber fiber optic cable and a second end having openings for the fibers from the cable. First and second keys for setting the polarity of the fibers within the connector located on opposing sides of the connector. The connector has either one of guide pins or guide pin receiving holes for guiding the connection with a second connector. The keys are movable between a first active position and a second retracted position, such that when one of the keys is in the first active position, the fibers are presented within the connector in a first polarity and when the second key is in the first active position, the fibers are presented within the connector in a second polarity reversed from the first polarity.

10 Claims, 10 Drawing Sheets

(56) References Cited

U.S. PATENT DOCUMENTS

| | | | |
|---|---|---|---|
| 8,770,863 B2 | 7/2014 | Cooke et al. | |
| 9,829,645 B2 * | 11/2017 | Good | G02B 6/3831 |
| 2012/0099822 A1 | 4/2012 | Kuffel et al. | |
| 2013/0272671 A1 | 10/2013 | Jones | |
| 2013/0322825 A1 | 12/2013 | Cooke et al. | |
| 2015/0241644 A1 * | 8/2015 | Lee | G02B 6/3825 385/76 |
| 2016/0377819 A1 | 12/2016 | Kuffel et al. | |

FOREIGN PATENT DOCUMENTS

| | | |
|---|---|---|
| JP | 2001051161 A | 2/2001 |
| JP | 2004184429 A | 7/2004 |

* cited by examiner

METHOD A POLARITY

METHOD A POLARITY

METHOD B POLARITY

METHOD B POLARITY

MPO CONNECTOR

REVERSIBLE POLARITY MPO FIBER OPTIC CONNECTOR

RELATED APPLICATION

This application is a continuation of U.S. patent application Ser. No. 14/319,132 filed on Jun. 30, 2014, now U.S. Pat. No. 9,829,645, herein incorporated by reference, that application in turn being related to U.S. patent application Ser. No. 13/934,378, filed on Jul. 3, 2013.

BACKGROUND

Field of the Invention

The present arrangement relates to fiber optic connectors. More particularly, the present arrangement relates to fiber optic connectors with reversible polarity.

Description of the Related Art

In the area of fiber optic connections, typical fiber optic systems usually have to establish a bi-directional pathway between a transmitter port on a first element and receiver port on a second element and vise versa. See for example schematic FIG. 1. In order for such a bidirectional systems to function, it is a requirement that one end of a fiber be connected to the light emitting source of a first equipment, often a type of laser or light emitting diode, and the other end connected to a receiver port on a second equipment. For the second fiber in the bi directional pathway, the other fiber needs to be connected to the light source on the second equipment and, at the other end, the receiver port of the first equipment.

Fiber optic connectors used for larger high-speed fiber optic systems often use multi-fiber cables supporting many bi-directional pathways. In one example the cables typically have 12 fibers in the cable, with the corresponding connectors for such cables housing multiple fiber optic members within the same connector body. Such a twelve fiber arrangement can support six of such bi-directional (duplex) pathways.

These connectors used for such high-speed fiber optic systems often employ what are termed multiple fiber optic members, called MPO (Multiple-Fiber Push-On/Pull-off) connectors and they typically support the twelve fiber (six duplex channel) arrangements within the same connector body.

Using FIG. 1 showing a single two way channel, there can be many segments of fibers between two components, each representing a fiber optic cable with a connector. In some cases, between segments, the fibers in the connector of a first segment pass directly across to the fibers of the second segment. However, in some cases, in order for the transmission signal to end up at the correct receiver port, at least one segment connection, the connectors must have the pin/fiber input/output on one side flipped so that the transmission signal exits on the other fiber in the channel.

This situation is referred to as connector "polarity" for each segment. A fiber cable segment with two connectors at either end that result in the same polarity across the segment is referred to as method A and a fiber cable segment with two connectors at either end that result in a flip in the polarity across the segment is referred to as method B. In FIG. 1, the first four segments are method A polarity, the fifth segment is method B polarity exhibiting a flip in the light pathways across the two fibers. Depending on the various fiber optic equipment arrangements, in the prior art, to make the correct connections, the installer needs to select cable segments (i.e. pre-terminated lengths of cable) that have the correct polarity.

This holds true for larger MPO connectors where the associated cables must still also eventually result in one end of a fiber being connected to a source and the other end connected to a receiver and vice versa for each bi-directional pathway supported. As shown in FIG. 2, the top shows Method A polarity where the blue fiber starts on position 1 on one connector on one side of the segment and is at the same location (position 1) on the other connector on the other side of the segment. This method A polarity arrangement would be a straight forward connection that passes the same connection polarity to the next segment of the installation.

The bottom part of FIG. 2 shows Method B polarity where the blue fiber starts on position 1 on one connector on one side of the segment and is at the opposite location (position 12) on the other connector on the other side of the segment. With Method B polarity the remaining fibers in the connector on the second side of the segment are all also transposed in position vis-à-vis the first connector. The management of connections in such MPO connectors between sources and receivers and the polarity of such connections is described in the standard TIA-568-C.3. This method B polarity arrangement would be a connection that reverses the connection polarity going forward to the next segment of the installation.

As shown in FIG. 1, in order for the light signal from one source to reach a receiver at the other end there typically must be an odd number of 'flips' in the cabling, where a 'flip' indicates a method B polarity segment, so that the fiber in connector position 1 is connected to position 2 on the other side, the fiber in connector position 2 is connected to position 1 on the other side, etc. . . .

These flips can be achieved via individual fiber assemblies and/or in the adapters that connect different fiber optic cabling segments together for example as shown in the basic design in FIG. 1 at segment 5. However, since fiber optic networks are dynamic environments, connections are often added or subtracted and, as such, the number of required flips changes within the cabling arrangement between equipment. Ensuring that there are an odd number of flips then requires one or more of the fiber optic assemblies' polarity to be changed as the connections are added or subtracted. This requires the installers and/or end users to stock assemblies of different polarities and lengths for every possible network configuration, given that assemblies are pre-terminated with a fixed polarity.

For example, the polarity of fiber optic systems is carefully considered during the design phase and is generally fixed upon completion because many patch cords come pre-terminated and the polarity of the connector(s) is set at manufacture. For example a patch cord having connectors for its end set at a first polarity (i.e. method A or method B) can only be used for example in FIG. 1 at certain segment locations. If for any reason the configuration changed, as will be explained in more detail below, the installer may require a new patch cord, possibly of a different length, and having its two connectors set at a different polarity. Consequently, end users must carry a large inventory of pre-terminated assemblies or order additional parts to allow for reconfigurations of the network topology.

The polarity of an MPO (Multiple-Fiber Push-On/Pull-off) style connector, whether it be method A or method B is determined by the relationship between the fibers and a "key" on the connector body, which is why polarity is sometimes referred to as "keying."

Prior art FIG. 3 shows a standard prior art MPO connector that has a single fixed key on its body. Thus, the polarity is set at the time of manufacture. Although some prior art arrangements have the ability to change the key/polarity of the connector, these solutions require the disassembling and reassembling of existing assemblies or the purchase of new assemblies. This increases either labor costs or material costs associated with these networks/connectors.

OBJECTS AND SUMMARY

The present arrangement overcomes the drawbacks associated with the prior art and provides for a reversible polarity MPO type connector that can be applied without worry of previous installation types or designs. The reversible polarity connector reduces installer's and customer's inventory, installation time, and ultimately lowers their cost.

Such a connector employs a movable key that allows a user to reverse the polarity of the connector without the need to open the connector housing. Additionally, the present connector can be employed in conjunction with a universal connector pin arrangement that also allows a user to push forward or retract the MPO guide pins to assist in accommodating the use of such connectors in both polarities, again without the need for opening the connector.

To this end, the present arrangement provides for a multi-fiber, fiber optic connector, having a housing having a first end for receiving a multi-fiber fiber optic cable and a second end having openings for the fibers from the cable. First and second keys for setting the polarity of the fibers within the connector located on opposing sides of the connector. The connector has either one of guide pins or guide pin receiving holes for guiding the connection with a second connector.

The keys are movable between a first active position and a second retracted position, such that when one of the keys is in the first active position, the fibers are presented within the connector in a first polarity and when the second key is in the first active position, the fibers are presented within the connector in a second polarity reversed from the first polarity.

BRIEF DESCRIPTION OF THE DRAWINGS

The present invention can be best understood through the following description and accompanying drawings, wherein.

DETAILED DESCRIPTION

Figure 1:
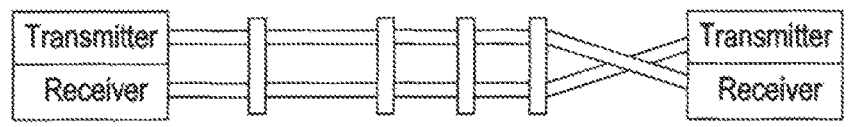
FIG. 1 is a schematic view of a typical fiber optic arrangement of fiber optic equipment and connectors.
Figure 2A:
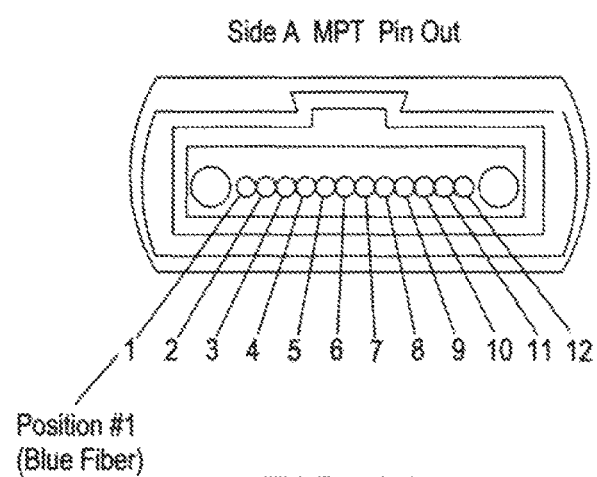
FIG. 2A-2D are a schematic view of fiber optic arrangements and polarity configurations.
Figure 2B:
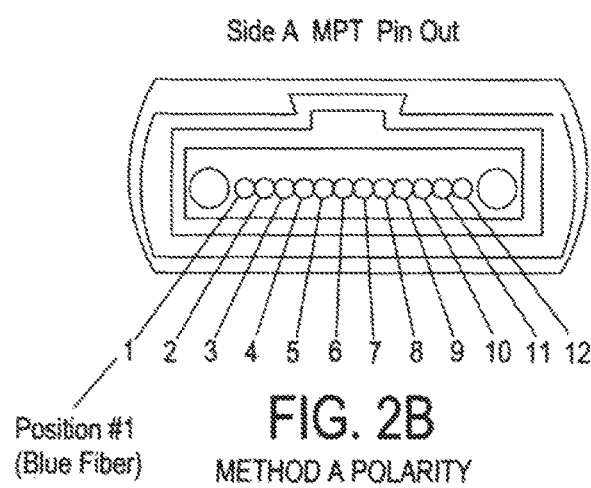
Figure 2C:
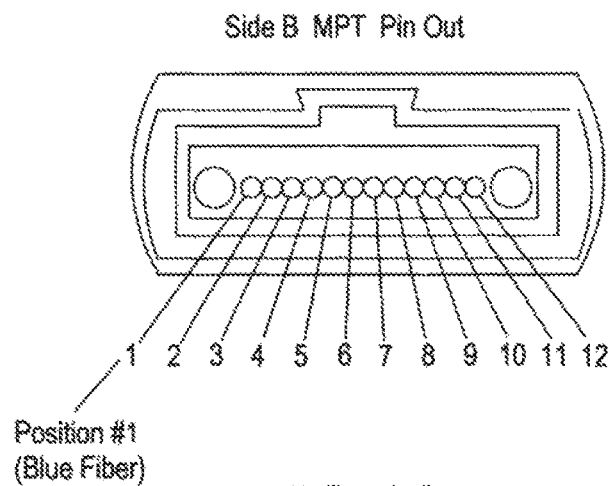
Figure 2D:
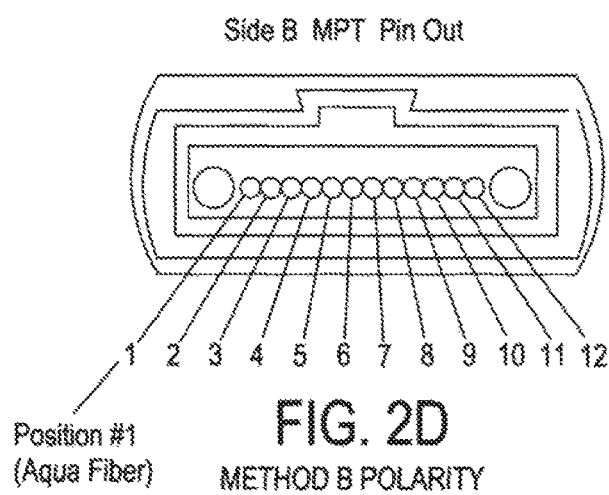
Figure 3:
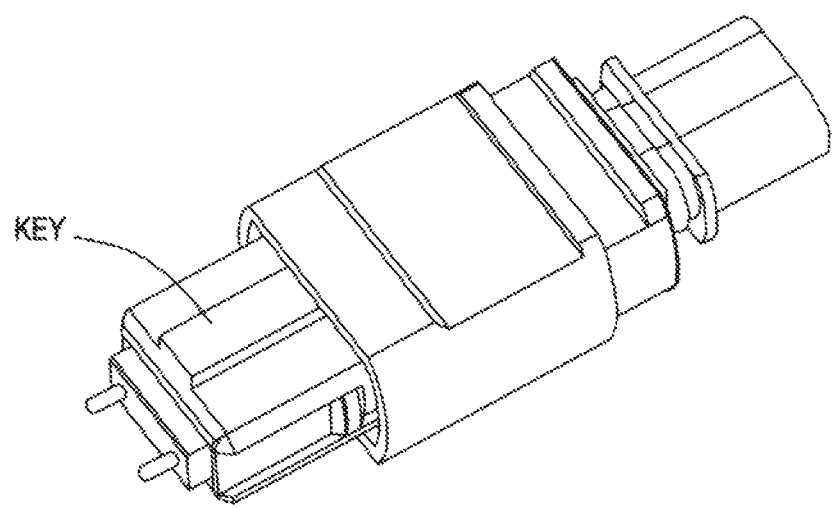
FIG. 3 shows a prior art fixed key MPO type connector.
Figures 4A, 4B:
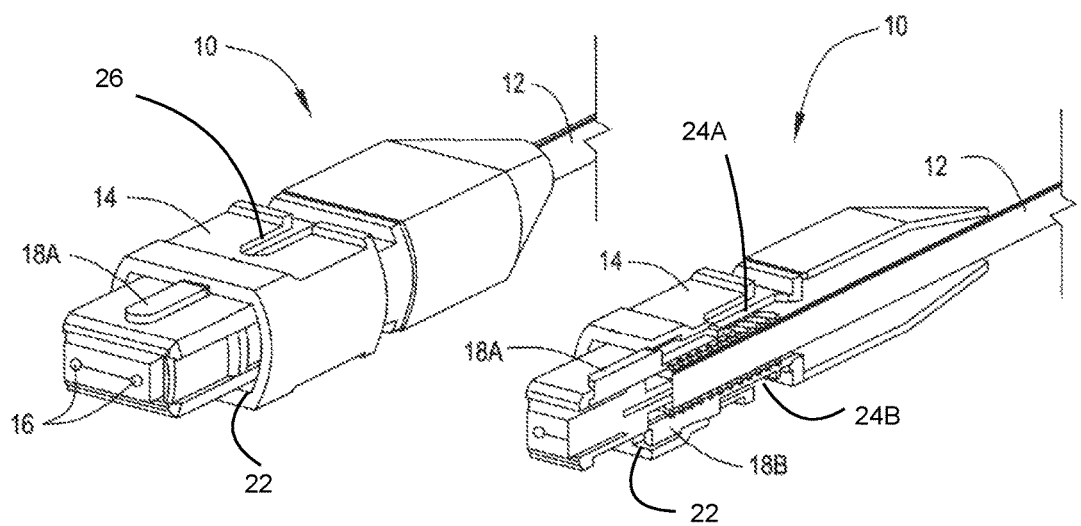
FIGS. 4A and 4B show a reversible polarity connector, in accordance with one embodiment.

In one embodiment of the present arrangement as shown in FIGS. 4A and 4B a connector 10 is provided at the end of a multi fiber cable 12. Connector 10 has a housing 14, guide pins/guide pin openings 16 and keys 18A and 18B. The housing 14 has a passageway 22 extending between a first end and a second end. It is noted that connector 10 is shown with guide pin openings 16 (female) but all of the features of the present arrangement are equally applicable to male/pins extended connectors 10 as well.

As a basic explanation the "key" sets the order for which the fibers in connector 10 are presented to an additional opposing connector 10. A key that is 'active' is one that is in position to engage with an adapter. If a key is said to be reversed then it means that the key on the opposite side of the connector (that being the one that was not previously 'active' is now 'active'. If connectors of both regular and reversed active keys are compared, it would be found that the fibers in connector 10 are presented to an opposing connector in opposite order. The setting of the key 18 is what sets the polarity (arrangement of fibers from cable 12) for connector 10 from the perspective of an opposing connector.

Thus, as shown in FIG. 4A, key 18A on the top of connector 10 is in a forward extended position. As shown in cut-away FIG. 4B, key 18A on the top of connector 10 is in a forward extended position with key 18B on the bottom of connector 10 in the retracted position within housing 14. Such an arrangement allows for keys 18A and 18B, on both sides of connector 10 and in respective first slot 24A and second slot 24B, to be alternately extended and retracted in order to achieve the desired polarity without disassembling the connector body. When cable 12 contains at least one of these connectors 10, keys 18A and 18B on top and bottom can be adjusted to determine whether the assembly (cable with a MPO connector on each end) is a 'Method A' or 'Method B' as referred to in the standards.

Applicants note that there are two keys 18A and 18B on connector 10 so that a fiber optic segment having two connectors 10 on either end may exhibit both A & B polarities options. When a user wants a fiber optic segment to be polarity A, the user simply sets the keys 18A on the tops of connectors 10 on both ends of the segment to the same setting, i.e. both keys 18A forward and active with both keys 18B retracted within housing 14) so that fibers exhibit the same presentation order on both sides of the fiber optic segment. To reverse to method B polarity, one of the keys such as a key 18A on one of the two connectors 10 is retracted into housing 14 and the other key 18B on that same connectors is pushed forward to active. This allows for the polarity of a single assembly or cable to be changed from A to B or B to A.

When keys 18A or 18B are retracted, nothing physically changes with fibers 12 in connector 10. Rather, the only change with connector 10 is a flipping of the order fibers 12 are presented to opposing connectors because the active or forward key 18A/18B is switched from one side of connector 10 to the opposite side.

It is noted that nothing is moving within housing 14. Fiber position number is always referenced by holding the key up and looking from left to right. By having two keys 18A/18B on opposing sides of connector 10 with the ability to activate one key or the other, this changes the definition of "up" for that connector. In other words with two movable keys 18A and 18B on connector 10 and the ability to easily change which key is active (used to determine which way is "up") a user can reverse the order of the fibers presentation on a connector 10 on one end of an assembly only, switching the segment from a Method A to a Method B or vice-versa.

Moreover, in the cut away example FIG. 4b, connector 10 shows top key 18A activated (extended out) and bottom key 18B retracted back into connector 10. As is evident from FIGS. 4A and 4B, keys 18A and 18B can be used to change the polarity of connector 10 without the need for opening any part of connector 10, such as housing 14, unlike the prior art configurations.

Figure 5:
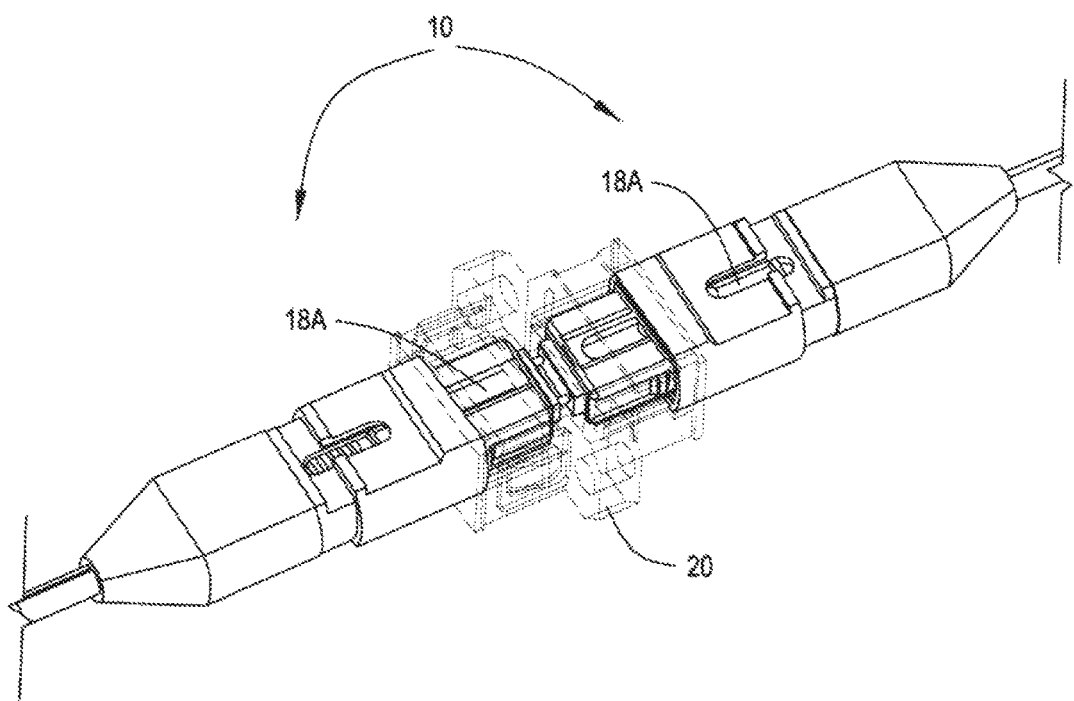
FIG. 5 shows two reversible polarity connectors in an adapter, in accordance with one embodiment.

As shown in FIG. 5, which shows two connectors 10 fitted into an adapter 20. Such keys 18A (only top keys 18A are visible in FIG. 5) can be operated by simply sliding key 18A forward and backward, or by pressing the key below the surface of the housing and locking arrangement, located towards the front of housing 14 of connector 10. Each key 18A and 18B can thus be operated independently with non-specialized tools and without disassembly of the connector, as the tab for keys 18 is accessible through a top opening 26 in at least part of the housing 14. It is noted that in FIG. 5, such a tab for adjusting keys 18, during a connection to another connector 10 via adapter 20, would actually fit within adapter 20. The other slide mechanism shown in FIG. 5 is related to another feature regarding an adjustable guide pin arrangement discussed in more detail below.

Figure 6A:
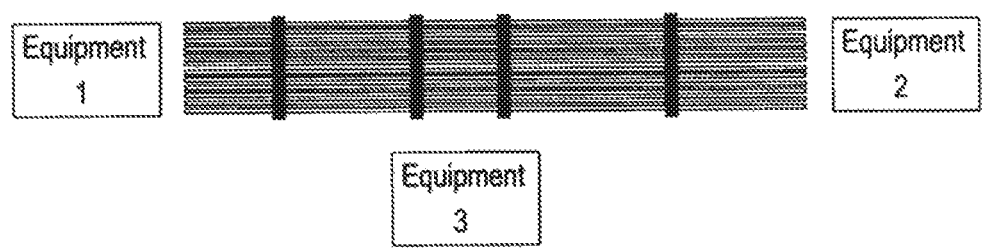
FIGS. 6A and 6B illustrate an exemplary fiber optic arrangement making use of reversible polarity connectors, in accordance with one embodiment.
Figure 6B:
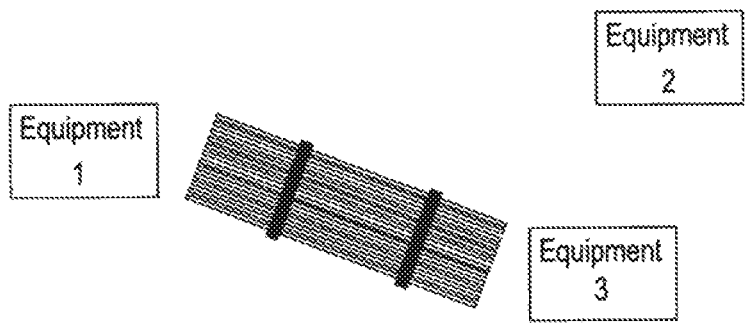

One exemplary arrangement for demonstrating the usefulness of connectors 10 is shown in FIGS. 6A and 6B. In FIG. 6A a first equipment #1 is shown connected to a second equipment #2 using five spans of fiber with MPO type connectors on such spans at four locations (#1-#4). That is, at each location #1-#4, there is an adapter 20 and two opposing MPO connectors, one for each segment on either side of the adapter. The connectors at points #1 through #3 each maintain the same polarity from the prior segment (Method A polarity), and at connector #4 the polarity reverses (Method B polarity) before entering equipment 2 as shown in the figure.

Turning now to FIG. 6B, assuming that owing to some required connection change, equipment #1 now needs to be connected to equipment #3 at a different location instead of equipment #2. As a result the third segment of fibers after location #2 and their connector facing segment 2 on the opposing side of location #2 now needs to be reversed in polarity (Method B) whereas in the prior FIG. 6A arrangement (connected to equipment #2) that same connector/segment would have simply retained the same polarity (Method A). As a practical matter, in the prior art, an installer or user would have had to replace the fiber segment 3 with a new patch fiber segment having a different (opposite) pre-terminated fixed polarity connector to fit into the adapter at location #2 in order to change the polarity of the connection now entering into equipment 3. Or, using prior art connectors that could change polarity, the user would have to open the housing of the connector on the third fiber segment after location #2 and change the polarity, possibly damaging/diminishing that connector and the fiber connections therein.

However using the present arrangement, assuming the connector for fiber segment three exiting location #2 was a connector 10 according to the present arrangement, connector 10 could simply be removed from the adapter 20 at location #2 have the appropriate key 18 retracted/moved forward, and reinserted into the adapter as shown in FIG. 6B, changed from Method A to Method B polarity.

In another embodiment of the present invention as shown in the following FIGS. 7-10, in addition to connector 10 being a reversible polarity connector 10 using keys 18A and 18B as explained above, such connectors 10 may also have a retractable guide pin arrangement 50 so that connector 10, in addition to having reversible polarity also can exchange between male (extended) and female (retracted) guide pin configurations.

Figure 7:
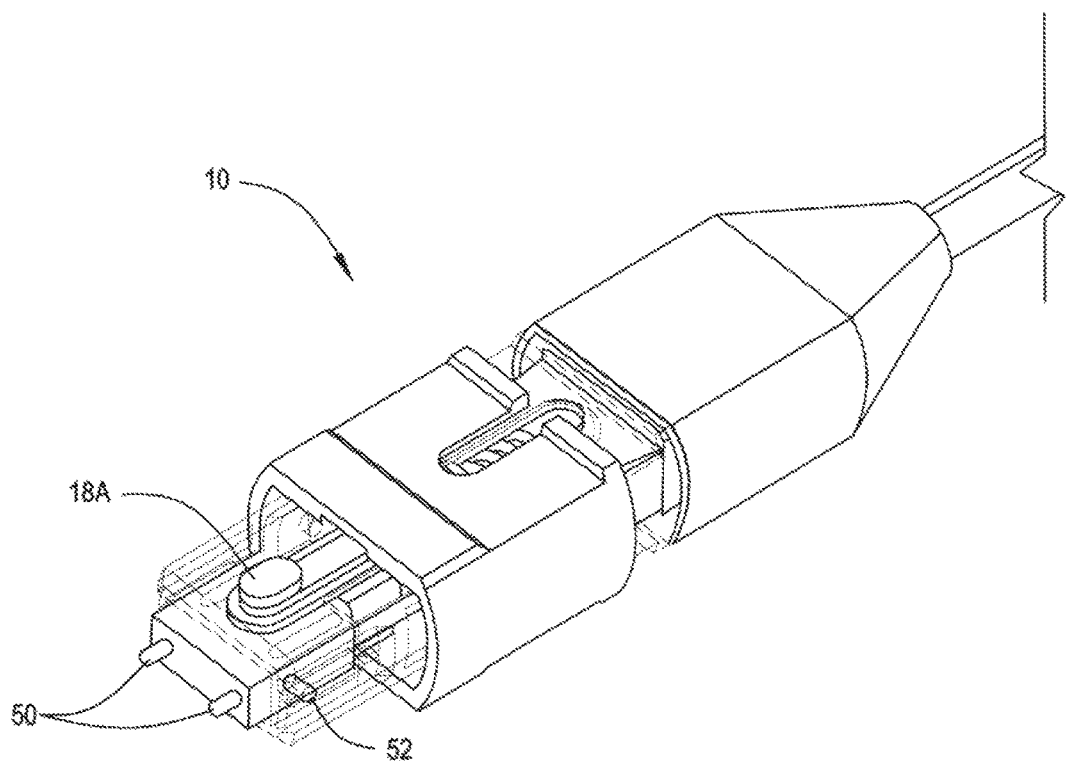
FIG. 7 shows a reversible polarity connector with retractable guide pins, in accordance with another embodiment.
Figure 8:
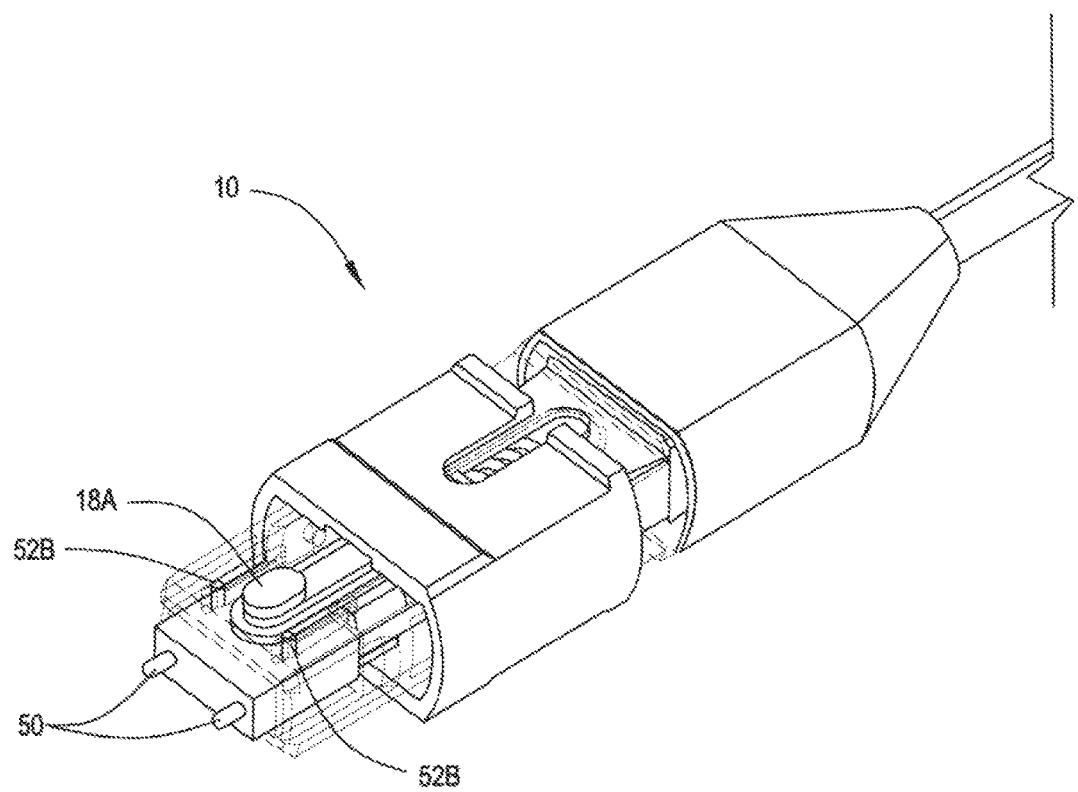
FIG. 8 shows a reversible polarity connector with retractable guide pins, in accordance with another embodiment.
Figure 9:
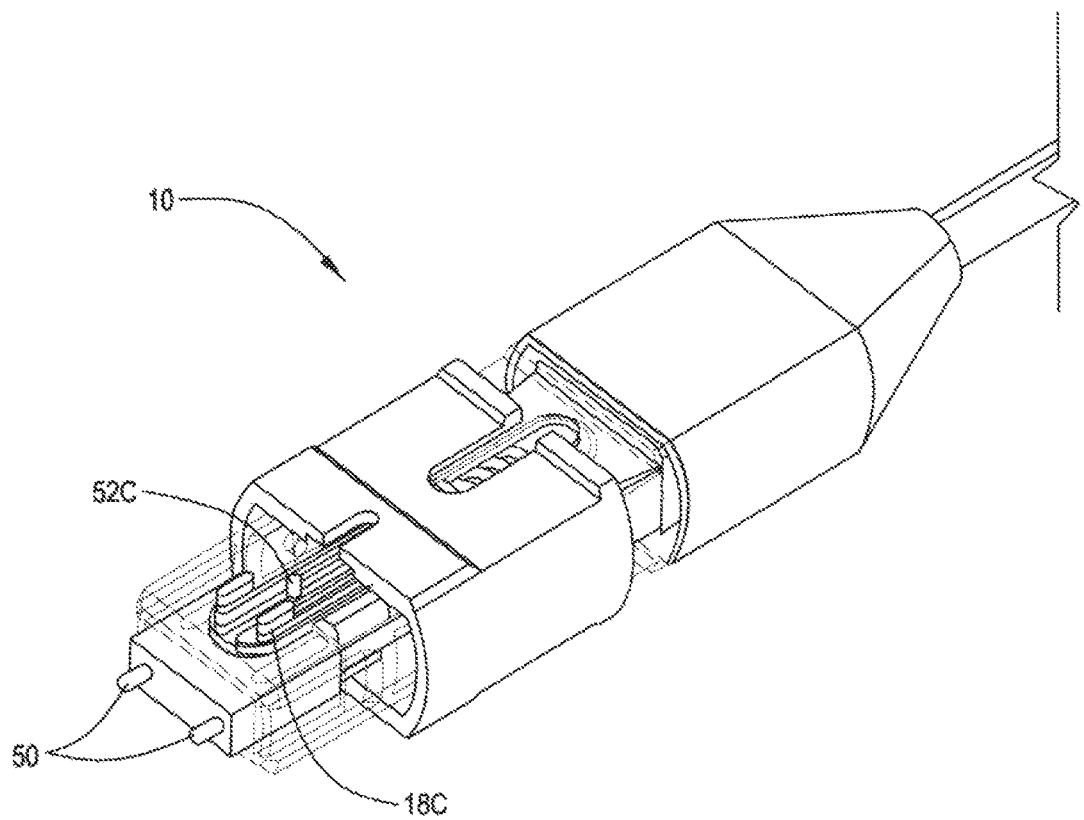
FIG. 9 shows a reversible polarity connector with retractable guide pins, in accordance with another embodiment.

As shown in FIG. 7, connector 10 has a guide pin arrangement 50 shown in the extended male configuration. Guide pin arrangement 50 includes an attached retraction tabs 52 (one opposing side not shown) located on either side of the connector. In FIG. 8 connector 10 has the same retractable guide pin arrangement 50 shown in the extended male configuration. In the embodiment shown in FIG. 8, guide pin arrangement 50 includes attached retraction tabs 52B located on the top of connector 10.

Figure 10:
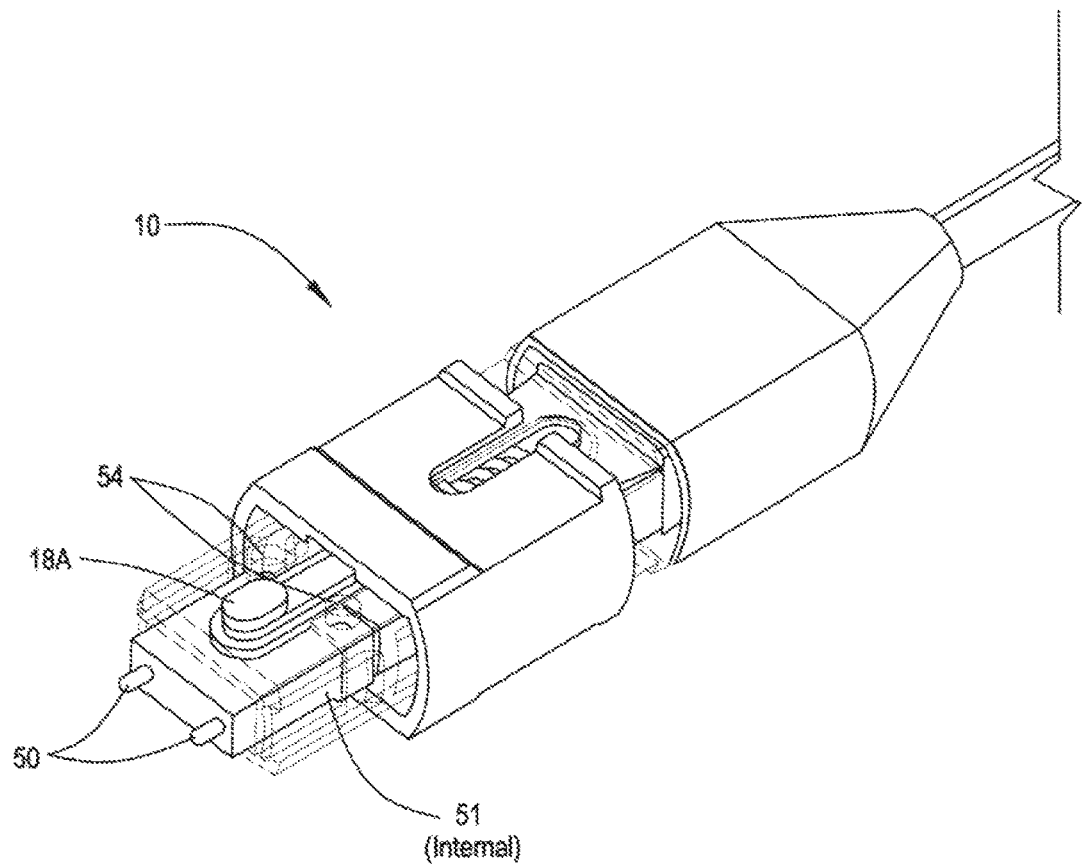
FIG. 10 shows a reversible polarity connector with retractable guide pins, in accordance with another embodiment.

In FIG. 9 connector 10 again has the same retractable guide pin arrangement 50. In the embodiment shown in FIG. 9, guide pin arrangement 50 includes a single attached retraction tab 52C located on the top of connector 10 in between a bifurcated arrangement of tab(s) 18C to change the polarity of key 18A. In FIG. 10 connector 10 has the same retractable guide pin arrangement 50. In the embodiment shown in FIG. 10, guide pin arrangement 50 are spring biased via biasing springs 51 (internal) and held in position using pin locks 54 on top of connector 10.

As an example of how the embodiment with retractable pins 50 supplements the usefulness of the reversible polarity of connector 10 using keys 18, Applicants note that standard equipment typically has pins in it, but some of the components in given channel (e.g. a 4 connector channel of patch cord, trunk, patch cord, trunk, patch cord etc. . . . ) will have pins and the rest will not since it is always required to mate a male to a female. So if a user were to add or subtract fiber segments/elements from the channel, even if the polarity can be changed, they may or may not end up with connectors with pin arrangements that can be mated together. By adding switchable guide pins this possible drawback can be overcome.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber optic connector with multiple optical fibers therein comprising:
    an outer housing having a passageway extending between a first end and a second end;
    first and second key slots and two separate first and second movable key structures within at least a portion of the passageway in the outer housing, where the first and second key slots each maintain a respective first and second movable key structure simultaneously, the first and second key slots and respective first and second movable key structures retained therein and being located on opposing sides of the fiber optic connector,
    the first and second movable key structures being movable within the respective first and second key slots, but otherwise retained within and movable without opening the fiber optic connector, the first and second movable key structures being provided within the fiber optic connector are configured to set the polarity of the multiple optical fibers within the fiber optic connector; and either one of guide pins or guide pin receiving holes for guiding a connection with a second fiber optic connector, wherein the first and second key structures are movable within their respective first and second key slots between a forward active position where the movable key structure is moved out to an exposed portion of its respective key slot towards the second end of the fiber optic connector and a retracted position where the movable key structure is moved out of the exposed portion of its respective key slot into and towards the first end of the outer housing such that when the first key structure is in the forward active position, the multiple optical fibers presented within the fiber optic connector are in a first polarity, and when the second key structure is in the forward active position, the multiple optical fibers are in a second polarity reversed from the first polarity.

2. The fiber optic connector according to claim 1, wherein the first and second moveable key structures are structures that are movable between the forward active position and the retracted position by sliding within said first and second key slots respectively.

3. The fiber optic connector according to claim 2, wherein when either one of the first and second movable key structures is in the forward active position within its key slot, and the other of the first or second movable key structures located on the opposite side of the connector is in the retracted position within its key slot, the first or second key structure in the retracted position is slid within inside at least a portion of the passageway in the outer housing.

4. The fiber optic connector according to claim 1, wherein the first and second movable key structures are accessible through an opening in at least a portion of the outer housing such that said first and second movable keys can be moved between the forward active position and the retracted position without opening the fiber optic connector.

5. The fiber optic connector according to claim 1, wherein the fiber optic connector has guide pins and the guide pins are configured to be movable to form guide pin openings.

6. The fiber optic connector according to claim 5, wherein the guide pins are movable to form said guide pin openings via a tab that extends through an opening within at least a portion of the outer housing so that the guide pins are moved without opening the fiber optic connector.

7. The fiber optic connector according to claim 1, wherein the forward active position is forward of the second end of the outer housing and the retracted position is between the first and second ends of the outer housing.

8. A fiber optic connector with multiple optical fibers therein comprising:

an outer housing having a passageway extending between a first end and a second end;

first and second key slots and two separate first and second movable key structures within at least a portion of the passageway in the outer housing, where the first and second key slots each maintain a respective first and second movable key structure simultaneously, the first and second key slots and respective first and second movable key structures retained therein and being located on opposing sides of the fiber optic connector; and the first and second movable key structures being movable within the respective first and second key slots, but otherwise retained within and movable without opening the fiber optic connector, the first and second movable key structures being provided within the fiber optic connector, wherein the first and second key structures are movable within their respective first and second key slots between a forward active position where the movable key structure is moved into an exposed portion of its respective key slot and a retracted position where the movable key structure is moved out of the exposed portion of its respective key slot and farther into the outer housing, such that when the first key structure is in the forward active position, the multiple optical fibers that are within the fiber optic connector are in a first polarity, and when the second key structure is in the forward active position, the multiple optical fibers are in a second polarity reversed from the first polarity.

9. The fiber optic connector as claimed in claim 8, further comprising either one of guide pins or guide pin receiving holes for guiding a connection with a second fiber optic connector.

10. A method for changing a polarity of a fiber optic connector having two polarity key structures on opposite sides of the fiber optic connector inside respective first and second key slots, a first key structure of the two polarity key structures being in a first position indicating a first polarity of the fiber optic connector and the second key structure of the two polarity key structures simultaneously being in a second position different from the first position, each of the first and the second key structures being movable into respective first and second positions within the respective first and second key slots, the method comprising:

moving the first key structure in the first position to the second position within the first slot; and moving the second key structure in the second position to the first position within the second slot thereby changing the polarity of the fiber optic connector to a second polarity, wherein said moving the first key structure and the second key structure is carried out without removing the first key structure and the second key structure from the fiber optic connector.

* * * * *